United States Patent
Altman

(10) Patent No.: US 6,505,781 B2
(45) Date of Patent: Jan. 14, 2003

(54) SELF-CONTAINED, AUTOMATIC MECHANICALLY OPENING AND CLOSING STEAM HEAD WITH BUILT-IN THERMOSTAT

(76) Inventor: Mitchell Altman, 5276 Orrville Ave., Woodland Hills, CA (US) 91367

( * ) Notice: Subject to any disclaimer, the term of this patent is extended or adjusted under 35 U.S.C. 154(b) by 83 days.

(21) Appl. No.: 09/767,397

(22) Filed: Jan. 22, 2001

(65) Prior Publication Data

US 2002/0096575 A1 Jul. 25, 2002

(51) Int. Cl.[7] .......................... B05B 17/04; B05B 1/24; B05C 1/00
(52) U.S. Cl. .......................... 239/11; 239/128; 239/136
(58) Field of Search .......................... 239/11, 13, 128, 239/133, 134, 135, 136, 569, 67, 75, 397.5; 261/115, 159, DIG. 15, DIG. 76, 160, 161; 122/448.1, 31.2, 14.3, 126, 130; 137/468; 251/11

(56) References Cited

U.S. PATENT DOCUMENTS

| | | | | |
|---|---|---|---|---|
| 3,642,201 A | * | 2/1972 | Potchen | 236/44 A |
| 4,262,191 A | * | 4/1981 | Lepper et al. | 219/497 |
| 6,065,740 A | * | 5/2000 | Morton | 261/115 |
| 6,227,526 B1 | * | 5/2001 | Morton | 261/115 |
| 6,289,852 B1 | * | 9/2001 | Murgu et al. | 122/448.1 |

* cited by examiner

*Primary Examiner*—Michael Mar
*Assistant Examiner*—Davis Hwu
(74) *Attorney, Agent, or Firm*—Ashen & Lippman

(57) ABSTRACT

A self-contained thermo-mechanically self-opening steam head that is normally generally flush with a supporting steam room wall when not in use so as not to pose a safety hazard. The steam head has a mechanical thermostat that automatically responds to the presence of heat as from steam to move a deflector plate, which normally generally blocks a steam outlet from the head, to an open position. That open position is spaced from but closely in front of the steam outlet. This allows steam to flow out of the outlet, but the deflector plate diverts the outward steam flow to a direction generally along the supporting wall. When the steam is shut off, the thermostat cools and thereby causes the deflector plate to return to its closed, blocking position. There is no electrical wiring or connection which could pose a major safety hazard in the presence of water.

12 Claims, 5 Drawing Sheets

SELF-CONTAINED, AUTOMATIC MECHANICALLY OPENING AND CLOSING STEAM HEAD WITH BUILT-IN THERMOSTAT

FIELD OF THE INVENTION

Steam emitting heads for steam rooms and the like.

BACKGROUND OF THE INVENTION

There have been a wide variety of steam head designs for use in conjunction with steam rooms. There are certain basic considerations or requirements for such a steam head. Desirably the steam head will disperse the steam generally evenly throughout the room. The hot steam should not be injected directly into the room, as in a stream generally normal to the surface of the room walls, as this would provide a serious hazard to the users of the steam room. Rather the steam flow should the generally parallel to or flush with the surface of the room walls. This also facilitates distribution of the steam throughout the room. To achieve these objectives, many prior art steam heads permanently projected into the steam room where they provided hazards to the steam room users should the users brushed or stumble against such protruding heads.

Some prior art steam heads only extended away from the wall when steam was being delivered into the steam room. Such steam heads were retracted to generally aligned or flush relationship to the wall when steam was not being delivered into the room. However such extending and retracting steam heads often involve the substantial cost and difficulty of installation and maintenance of electrical or and/or hydraulic control lines. Such complexity increased the risk of malfunction or non-function. Further, any use of electricity in a steam room environment poses a potential safety hazard and at the very least requires special equipment and precautions.

SUMMARY OF THE DISCLOSURE

Prior Art

FIGS. 1 and 2 illustrate a prior art steam head H. The forward end E of the steam head extends outwardly into the steam room. That forward end has one or more transversely directed steam outlets O from which steam can flow in the direction shown by the small arrows, i.e., generally parallel to the surface of the supporting steam room wall W. As noted above, such perpetually projecting forward end of the steam head presents a hazard to the users of the steam room.

Embodiment of FIGS. 3 and 4

FIG. 3 illustrates one presently preferred embodiment of the invention. This steam head includes a housing having a steam inlet and a front wall having a steam outlets in the form of a plurality of vents. The housing may be conveniently mounted on an upright steam room wall with the forward end of the housing generally aligned with the wall, and with the remainder of the housing extending rearwardly behind the wall. The outlet vents are normally substantially closed by an overlying plate section that is normally disposed generally flush with the forward end of the housing. Only when substantial steam is to be admitted into the steam room does the plate section move forwardly a short distance, such as ¼ of an inch, from the outlet vents to allow such steam flow. In the illustrated steam head such forward movement of the plate section is caused by a wax filled thermostat that is connected to the plate section. The thermostat automatically responds to a flow of steam into the head housing. Thus the illustrated steam head this self-contained, requiring no electrical or hydraulic connections, or even battery power. The outlets are opened automatically when steam is allowed into the head housing. The outlets are automatically closed when flow of steam into the housing is terminated; the movement of the plate section which thus closes the outlet vents thereby returns the plate section to the flush position generally aligned with the housing front wall and the room wall. Since the front end of the head housing does not have to extend outwardly into the room sufficiently to accommodate transversely directed steam outlets, that extension can be a minimum amount, as for example ⅜ of an inch.

Another preferred embodiment of steam head is illustrated in FIGS. 5–7. This steam head it is similar to the steam head shown in FIG. 3 and operates in a similar manner.

IN THE DRAWINGS

DETAILED DESCRIPTION OF THE DRAWINGS

Figure 2:
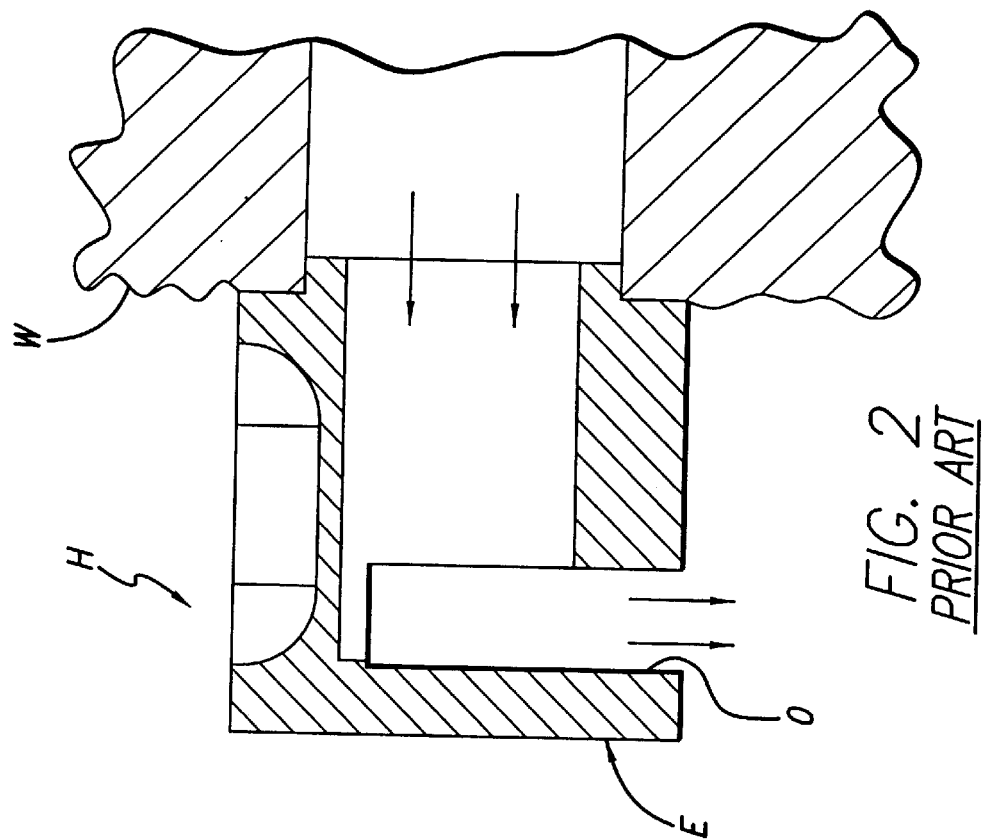
FIG. 2 is a side sectional view of the head of FIG. 1, taken generally along line 2—2 of FIG. 1.
Figure 1:
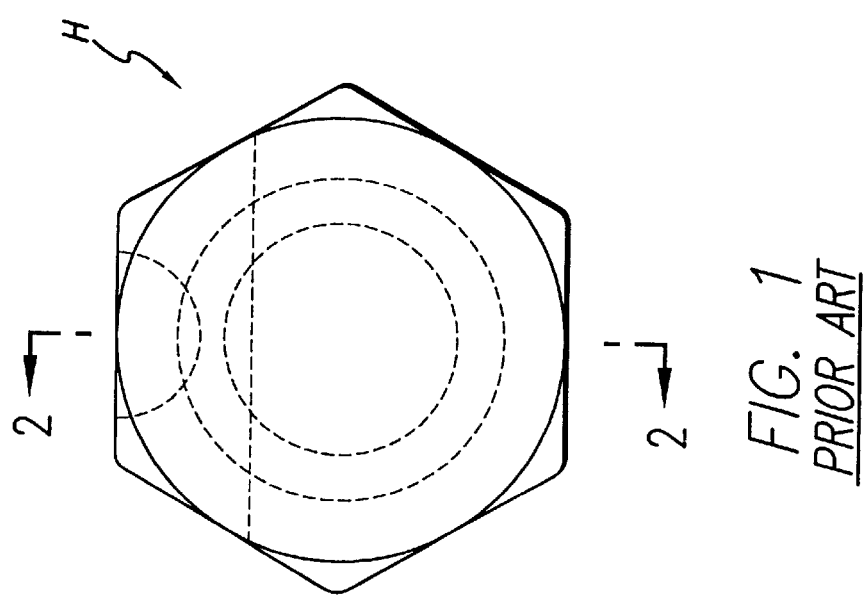
FIG. 1 is a schematic end view of a prior art steam head.
Figure 3:
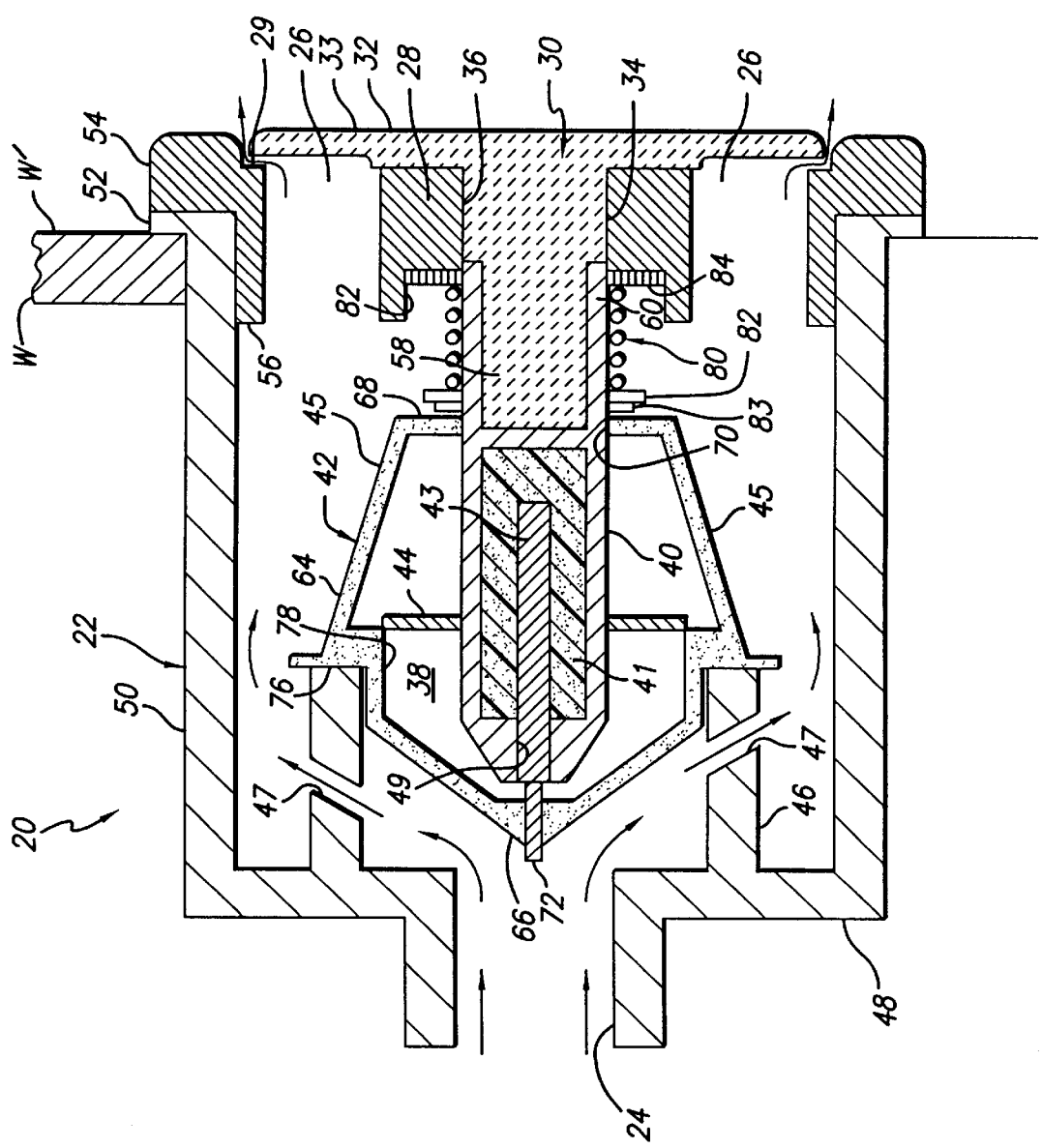
FIG. 3 is a side sectional view of a self-contained, non-electrical, automatically opening steam head which embodies one presently preferred embodiment of the present invention, showing the steam head closed.
Figure 4:
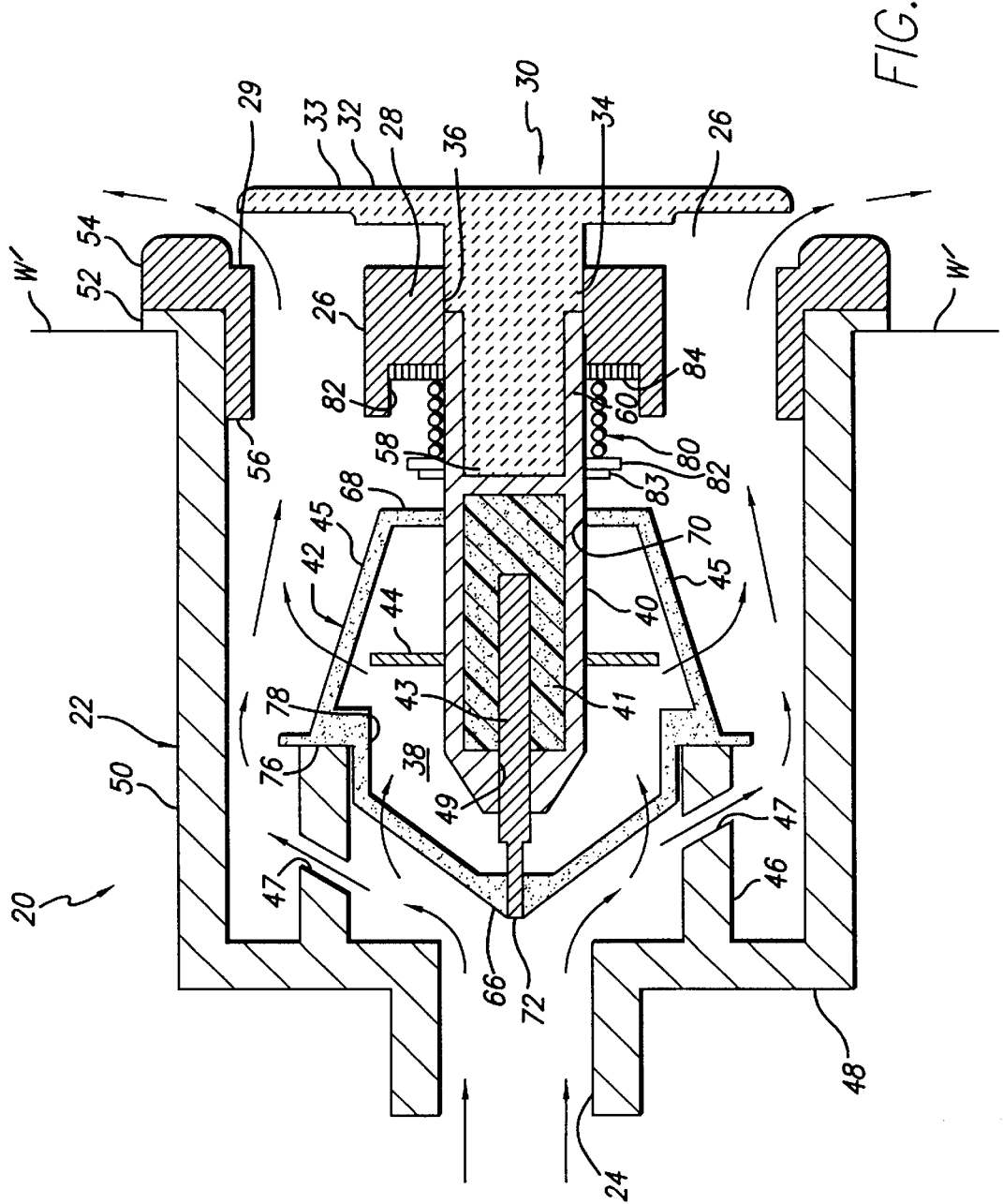
FIG. 4 is a side sectional view of the steam head of FIG. 2, showing the steam head open.

In general, referring to FIG. 3 the illustrated steam head 20 comprises a housing 22 which has a steam inlet 24 and a steam outlet 26 in the form of a plurality of vents or openings in the forward wall 28 of the housing. A plunger 30 has a deflector plate section 32 that normally substantially overlies the vents 26 and a central stem section 34 that extends rearwardly through a central opening 36 in the housing forward wall 28. The plunger 30 is movable linearly forward and backward relative to the forward wall 28. In the rearward position the plate section 32 of the plunger substantially closes the outlet vents 26. A small limited amount of flow is allowed for safety reasons. In the forward position, as shown in FIG. 4, plate section 32 is spaced away from and thus fully opens the vents 26. The forward position of the plate section 32 is still in front of and only a short distance such as ¼ of an inch away from the vents 26 so that the plate section still blocks direct discharge of the steam into the room. However the plate section 32 does divert the stream flow to a direction generally parallel to the adjacent room wall W.

In the illustrated steam head 20, the plunger 30 is connected to and moveable by a mechanical wax filled thermostat 38.

The illustrated thermostat 38 is a standard unit such as made by the Stant Manufacturing Co. of Connersville, Ind., Model No. 14028. This thermostat is of the type used in automotive cooling systems, and is commonly known as an "activator".

The illustrated thermostat 38 has a frame 42 that supports a forwardly-rearwardly movable piston 40. The piston 40 has a chamber 41 filled with wax that expands when it is heated and a rod 43 extends unto the chamber 41 from the rear. The rear end 72 of the rod 43 is fixed to a rear strap 66 of the frame 42. The piston 40 slidably extends through an opening 70 in a front ring 68 of the frame 42. The ring 68 is supported by a pair of frame front straps 45. The front straps 45 and the rear straps 66 are supported on a mid ring 76 of the frame 42. The piston 40 carries a transverse disk 44 that is somewhat larger in diameter than a large central opening 78 of the mid ring 76. FIG. 3 shows the thermostat 38 in the cool or substantially closed position with the disk 44 closing off the mid ring opening 78 (some steam can flow as shown by the arrows in that FIG. 3 to avoid pressure buildup). A coil spring 80 around the piston 40 urges it rearwardly to this closed position.

As shown in FIG. 4, when steam enters the housing 22, the wax in the chamber 41 is heated, causing it to expand. As the wax in the chamber 41 expands, it tries to expel the rod 43 rearwardly but since the rod 43 is fixed, the Piston 40 is shifted forwardly relative to the rod 43 and the thermostat frame 42. The disk 44 is moved forwardly away from the mid ring opening 78 to allow a full flow of steam through the opening 78. The steam flow from the inlet 24 to the opening 78 is unobstructed by the rear strap 66. Similarly, the steam flow from the opening 78 to the outlet vents 26 is also unobstructed by the front straps 45. The steam flow is illustrated by arrows in FIG. 4.

A generally tubular support section 46 which extends forwardly from the rear wall 48 of the head housing 22 locates and supports the thermostat frame 42.

When steam enters the inlet 24 and heats wax in the thermostat chamber 41 sufficiently to cause the thermostat piston 40 to move forwardly against the spring 80, the plunger 30 is thereby also moved forwardly to space the deflector plate section 32 forwardly away from the steam outlet vents 26 to allow a full discharge of steam generally along the wall W as described above.

When further steam flow is turned off, the wax in chamber 41 cools and contracts. This allows the spring 80 to move the thermostat piston 40 and the plunger 30 back rearwardly so that the steam outlet vents 26 are again substantially blocked by the deflector plate section 32.

Now to consider the illustrated steam head 20 in further detail.

The head housing 22 is a generally cylindrical structure having a central axis. The steam head 20 will be described in this application as mounted on a generally upright steam room wall W with the axis generally horizontal and with the forward end wall 28 of the housing 22 generally aligned with the outward or forward surface W of the wall. The illustrated steam head housing 22 has a generally tubular side wall 50 that extends front-to-rear, and the generally upright rear end wall 48. The generally upright forward wall 28 of the housing is provided by an end cap that is connected to and preferably forms a seal with the forward end of the housing side wall 50. In this connection, the housing side wall has a radially outwardly extending flange 52 at its front end. The front wall cap 28 has a radially outward annular rim portion 54 that generally aligns with and abuts the side wall flange 52. The front wall cap 28 also has a circular disk shaped center portion 56.

FIG. 3 illustrates the mounted housing 22 extending through a generally marching circular cutout in the steam room wall W. The room wall W is disposed around the housing cylindrical side wall 50 just to the rear of the flange 52. Thus the bulk of the housing 22 extends rearwardly of the room wall W, while only the flange 52 and the front end cap 28 extend in front of the room wall W. In one satisfactory version of the steam head, the front face of the head is about ⅜ of an inch forwardly of the outer front surface W' of the shower room wall W. The outer or peripheral the edge of the end cap outer portion 54 is rounded off to prevent injury to the shower user. As will be discussed in more detail below, When the deflection plate section 32 is in its forward position (FIG. 4), the front surface 33 of that plate section extends only a short additional distance forward, such as ¼ of an inch. Thus, the front surface 33 may extend at maximum only about ⅝ of an inch away from the supporting wall front surface. The outer or peripheral edge of the deflector plate section 32 is also rounded to prevent injury.

The front end cap 28 has a plurality of the openings or vents that provide the steam outlet 26 from the housing 22. The illustrated head 20 has eight such openings or vents. The illustrated openings 26 are circular but they make take various shapes as may be desired. The front end cap 28 also has the central opening 36 through which the stem section 34 of the plunger 30 extends in a front-to-rear sliding relationship.

The deflector plate section 32 of the plunger 30 extends across the front surface of the end cap 28. When the plunger 30 is in the rearward position as shown in FIG. 3, the deflector plate section 32 covers over and substantially closes off the steam vents or openings 26. A small gap is provided around the edge of the closed deflector plate section 32 to prevent excess pressure buildup It will be noted that the front surface 29 of the cap center section 56 is sufficiently recess rearwardly from the forward face of the annular outer section 54 so that, when the plunger 30 is in the rearward closed position, the front face 33 of the deflector plate section 32 is generally aligned with the forward face of the annular outer section 54. In this position, the deflector plate section 32 presents no danger or risk of injury to a user whose body may brush against the front of the steam head. As noted above, the edge of the cap outer portion is rounded off for safety purposes.

The forward end of thermostat piston 40 is connected to the plunger 30. More particularly, the rearward end 58 of the plunger stem 34 is cylindrical and somewhat reduced in size. That stem end 58 is fixedly received within a mating cylindrical recess at the forward end 60 of the thermostat piston 40. The thermostat piston 40 fixedly supports the annular disk 44 that extends transversely across the thermostat mid-ring opening 78.

The illustrated thermostat frame 42 includes the mid-ring 76, the rear strap 66, and the front straps 45 that support the front ring 68. The front ring 68 has the central opening 70 through which the thermostat piston 40 slidingly extends. The thermostat piston 40 has the wax filled chamber 41 into which the rod 43 extends. The rear end 72 of the rod 43 is fixed to the rear strap 66.

As shown in FIG. 4, when the incoming steam has sufficiently heated and expanded the wax in the thermostat rod chamber 41, the thermostat piston 40 is moved forwardly relative to the rod 43. This moves the disk 44 forwardly away from the mid-ring opening 78 to allow full flow through the opening 78. This also moves the plunger 30 forwardly so as to space the deflector plate in front of and away from the steam outlet vents 26. Good results have been achieved with a forward movement of about ¼ of an inch. As shown by the arrows in FIG. 4, the steam comes into the head housing 22 through the inlet 24, moves forwardly past the rear strap 66, through the mid-ring opening 78, past front straps 45 and emerges from the outlet vents 26. As the steam, emerges in a direction generally normal or at a right angle to the room wall W, the steam it is deflected and redirected by the deflection plate section 32 to a path generally parallel to the room wall. This facilitates movement of the steam throughout the room, while avoiding the hazard of direct steam jets flowing generally perpendicular to the wall into the steam room.

When the steam generating unit (not shown) is shut off, the temperature in the stem head housing 22 will cool down so as to allow the wax in chamber 41 to cool and contract. The piston 40 is thereby allowed to return to its original rearward position as shown in FIG. 3 under the urging of the compression spring 80. This moves deflection plate section 32 so that it again substantially blocks the outlet vents 26. The forward surface 33 of the plate section 32 is then generally flush with the forward end of the head housing 22.

Figure 5:
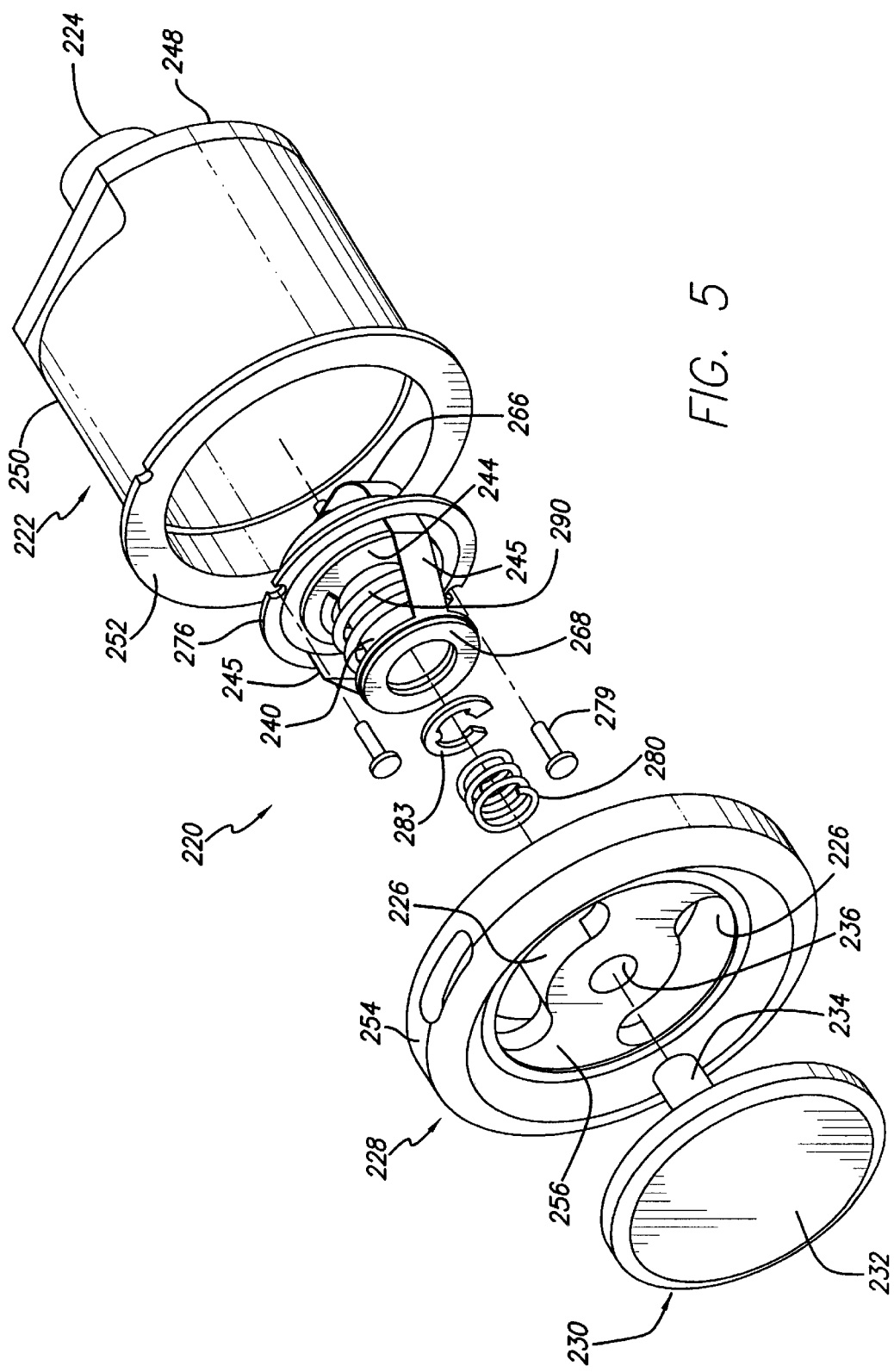
FIG. 5 is a schematic perspective view of another presently preferred embodiment of the steam head of the invention.
Figure 6:
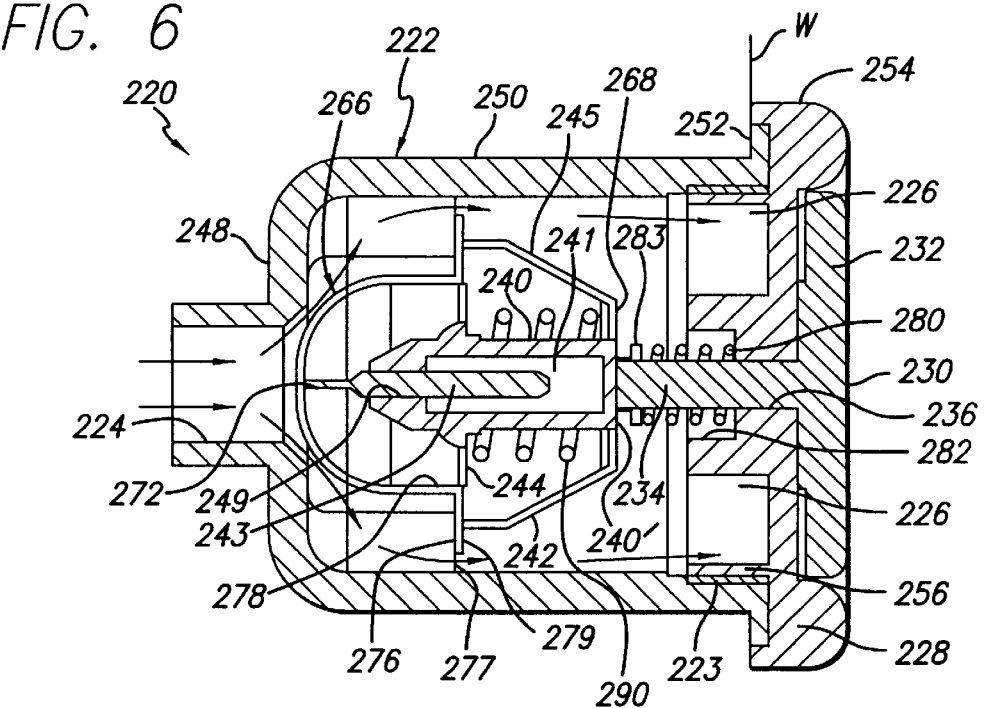
FIG. 6 is a side sectional view of the steam head of FIG. 5, showing the steam head closed.
Figure 7:
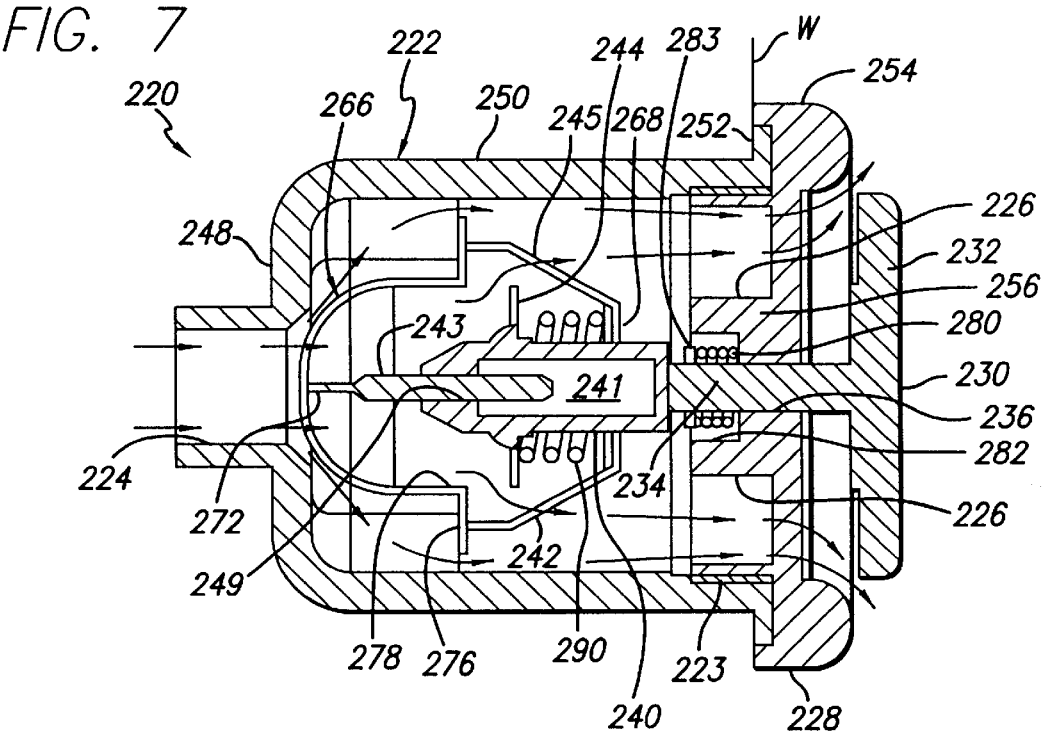
FIG. 7 is a side sectional view of the steam head of FIG. 5 showing the steam head opened.

Embodiment of FIGS. 5–7

FIGS. 5–7 illustrate another presently preferred embodiment of steam head 220 which is similar in construction and operation to steam head 20. The illustrated steam head 220 has a housing 222 which includes a cylindrical side wall 250, a generally circular rear wall 248, a central steam inlet 224 at its rear end, and a peripheral flange 252 at its forward end. A generally circular end cap 228, which is screwed into the forward end for the housing 222 by means of mating threads 223, provides the housing forward wall. The end cap 228 has a radially outer portion 254 which abuts the end flange 252. The end cap 228 also has a circular central portion 256 which has a central opening 236 and a pair of large steam outlet vents 226 shown best in FIG. 5. A plunger 230 has a generally circular deflector plate section 232 and a central stem section 234 which extends through the central opening 236. When the steam head 220 is not in use, the plate section 232 overlays and substantially closes the outlet vents 226 as shown in FIG. 6.

The rearward end of the stem section 234 abuts the forward end 240' of a central piston 240 of a thermostat 238. The illustrated thermostat 238 is a standard wax fill activator. It is fixedly mounted within the housing 222. More particularly, the thermostat 238 has a frame 242 that includes an annular mid-ring 276 with a large central opening 278, a rear strap 266, and a pair of front straps 245 that support a front ring 268. The interior of the head housing 222 is formed with a plurality of forwardly facing bosses 277 that engage the rearwardly facing surface of the thermostat frame mid-ring 276. The thermostat frame 242 may be fixed to the shower head housing 222 as by means of screws 279 (FIG. 5) which extend through the mid-ring 276 and screw into suitable threaded holes in the bosses 277. Illustrated thermostat 238 is a standard unit such as one made by Stant Manufacturing Co. of Connersville, Ind. having model Number No. 13848.

The thermostat piston 240 has an internal chamber 241 that is occupied with wax that expands when heated. A rod 243 extends into the chamber 241 from the rear. The rod 243 is slidably received in an opening 249 at the rear of the piston 240. The rear end 272 of rod 243 is fixed to the rear strap 266. A coil spring 290 disposed around the piston 240 tends to bias the piston rearwardly to the closed position (FIG. 6). The piston 240 carries a transversely extending disk 244 that closes the mid-ring opening 278.

In the illustrated shower head 220, when there is no steam entering the inlet 224, the parts occupy the rearward positions shown in FIG. 6. As noted above, the plate section 232 is rearwardly positioned so as to overlay and substantially close the steam outlet vents 226. The central thermostat piston 240 is in its rearward position and the disk 244 is closing the large opening 278. A coil compression spring 280 is disposed around the plunger center stem section 234 and its rear end engages a retaining ring 283 locked to the plunger center stem section. The spring 280 tends to urge that stem section 234 rearwardly to the position shown in FIG. 6 where it abuts the forward end 240' of the piston 240. The forward end of the spring 280 is received in a recess 282 in the rear face of the end cap 228 surrounding the central opening 236. To prevent excess pressure buildup, a limited steam flow is allowed through the inlet 224, past the rear strap 266, around the bosses 277, past the front straps 245, through the vents 226 and through the gap around the outside edge of the plate section 232.

When steam enters the inlet 224, the thermostat 238 is heated, which causes its central piston 240 to move forwardly as shown in FIG. 7. More particularly, the wax in chamber 241 is heated and expands. This tends to expel the rod 243 from chamber 241. Since the rod 243 is fixed to the frame 243 and cannot move rearwardly, the piston 240 is moved forwardly against the urging of the spring 290. This moves the disk 244 away from the large opening 278. The piston end 240' which abuts the plunger 230 thereby moves the plunger forwardly to space the plate section 232 away from the outlet vents 226. This allows steam to flow freely outwardly from the vents 226. As discussed above in connection with steam head 20, the steam exiting the vents 226 is not allowed to be directly sprayed into the steam room, but rather is diverted by the plate section 232 which causes the steam to flow generally parallel to the steam room wall W. The forward force exerted by the thermostat piston 240 is sufficiently stronger than the resistive force of the springs 280 and 290 to allow this forward opening movement.

When steam ceases to flow into the steam head housing 222 and the thermostat 238 cools sufficiently, the wax will cool and contract and the springs 280 and 290 will respectively force the thermostat piston 240 and the plunger 230 rearwardly to the positions shown in FIG. 6 wherein the disk 244 closes the large opening 278 and the plate section 232 again overlays and substantially closes the outlet vents 226.

In other words, the rearward movement of the thermostat piston 240 affords or causes this rearward movement of the plunger 230 and plate section 232 by moving out of the way so that the plunger can move rearwardly under the continued urging of the spring 280.

Various modifications may be made to the illustrated structures is without departing from the spirit and scope of the present invention as set forth in the following claims.

What is claimed is:

1. An automatically opening and closing steam head comprising:

a) a housing for being mounted on a wall having an outer surface, said housing having a steam inlet and a steam outlet, said inlet adapted to be connected in fluid communication with a source of steam, said outlet being generally aligned with the wall outer surface when said housing has been mounted on the wall, b) a steam control member having an outer face and being mounted on the housing for movement between a closed inward position where said outer face is generally aligned with the wall outer surface and said member substantially blocks said outlet to limit discharge of steam from said outlet, and an open outward position where said outer face is spaced outwardly away from the wall outer surface and said control member is spaced away from but in front of said outlet so that a full flow of steam is allowed to pass outwardly through said outlet but the flow is diverted by said control member into a direction generally parallel to the wall outer surface, and c) a mechanical thermostat having a movable element that is moved solely by application of heat to said thermostat, said element being operatively related to said control member for affording movement of said control member when said element moves in response to the presence or absence of the steam, said thermostat element being moved sufficiently outwardly when it is heated by the steam so as to afford movement of said control member to said open position, said thermostat element being moved sufficiently inwardly when it is no longer heated by the steam so as to afford movement of said control member to said closed position.

2. The steam head of claim 1 wherein, when said control member is in the outward position, said control member remains in close proximity to the mounting wall outer surface.

3. The steam head of claim 2 wherein the control member, when in the outward position, is about 5/8 inch from the mounting wall outer surface.

4. The steam head of claim 1 wherein said mechanical thermostat includes a waxed filled chamber in which said moveable element is at least partially disposed so that said element is moved by expansion and contraction of the wax in response to heating and cooling of the wax in said chamber.

5. The steam head of claim 4 further including a biasing member constantly urging said control member to the closed inward position.

6. The steam head of claim 1 further including a biasing member that constantly urges said steam control member to the closed inward position.

7. The steam head of claim 1 wherein said housing has a front outer wall, said steam outlet is located in said outer wall and occupies a major portion of said front outer wall.

8. The steam head of claim 1 wherein the steam head is constructed and arranged so that the movement between the closed and opened positions is a generally linear movement generally normal to the outer surface of the mounting wall.

9. The steam head of claim 1 wherein said steam control member is a generally thin flat plate extending generally parallel to the mounting wall.

10. A method for controlling a steam head which comprises a housing for mounted on a wall having an outer surface, the housing having a steam inlet and a steam outlet, the inlet connected in fluid communication with a source of steam, the outlet being generally aligned with the wall outer surface, and a steam control member having an outer face and being mounted on the housing for movement between a closed inward position where said outer face is generally aligned with the wall outer surface and the control member substantially blocks the outlet to limit discharge of steam from the outlet, and an open outward position where the outer face is spaced outwardly away from the wall outer surface and the control member is spaced away from but in front of the outlet so that a full flow of steam is allowed to pass outwardly through the outlet but the flow is diverted by the control member into a direction generally parallel to the wall outer surface, said method comprising the steps of:

a) moving the control member solely mechanically and automatically in response to a temperature increase to above a predetermined temperature from the closed position to the open position, and b) moving the control member solely mechanically and automatically in response to a temperature decrease to below said predetermined temperature from the open position back to the closed position.

11. A solely mechanically operable steam head comprising:

a) a housing for being mounted on a wall having an outer surface, said housing having a steam inlet and a steam outlet, said inlet adapted to be connected in fluid communication with a source of steam, said outlet being generally aligned with the wall outer surface when said housing has been mounted on the wall, b) a steam control member having an outer face and being mounted on the housing for movement between a closed inward position where said outer face is generally aligned with the wall outer surface and said member substantially blocks said outlet to limit discharge of steam from said outlet, and an open outward position where said outer face is spaced outwardly away from the wall outer surface and said control member is spaced away from but in front of said outlet so that a full flow of steam is allowed to pass outwardly through said outlet but the flow is diverted by said control member into a direction generally parallel to the wall outer surface, said control member outer face being closely adjacent to said wall outer surface when said member is in the open position, and c) a solely mechanical temperature responsive operating device having no electrical connections, said device having a movable element that is operatively related to said control member for affording movement of said control member between said closed and open positions in response to predetermined temperature changes of said device.

12. The steam head of claim 11 wherein said control member outer surface is about 5/8 inch from said outer wall surface when said control member is in the open position.

* * * * *